(12) United States Patent
Inoue et al.

(10) Patent No.: US 9,669,813 B2
(45) Date of Patent: Jun. 6, 2017

(54) VEHICLE DRIVING SUPPORT CONTROL DEVICE

(71) Applicant: TOYOTA JIDOSHA KABUSHIKI KAISHA, Toyota-shi, Aichi-ken (JP)

(72) Inventors: Shintaro Inoue, Naka-gun (JP); Hideo Inoue, Ashigarakami-gun (JP); Yutaka Hirano, Susono (JP); Pongsathorn Raksincharoensak, Koganei (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/075,273

(22) Filed: Mar. 21, 2016

(65) Prior Publication Data
US 2016/0297478 A1    Oct. 13, 2016

(30) Foreign Application Priority Data

Apr. 8, 2015 (JP) .................................. 2015-79630

(51) Int. Cl.
| | |
|---|---|
| *B60T 8/24* | (2006.01) |
| *B60T 8/175* | (2006.01) |
| *B60T 8/1755* | (2006.01) |
| *B62D 6/00* | (2006.01) |
| *B62D 15/02* | (2006.01) |

(52) U.S. Cl.
CPC .............. *B60T 8/246* (2013.01); *B60T 8/175* (2013.01); *B60T 8/1755* (2013.01); *B62D 6/007* (2013.01); *B62D 15/0265* (2013.01); *B60T 2210/36* (2013.01)

(58) Field of Classification Search
CPC ............................ B62D 15/025; B60T 8/246
See application file for complete search history.

(56) References Cited

U.S. PATENT DOCUMENTS

2012/0226417 A1*  9/2012  Nishikawa ............ B60T 8/1755
                                                       701/42

FOREIGN PATENT DOCUMENTS

| JP | 2000-72021 A | 3/2000 |
|---|---|---|
| JP | 4173292 B2 | 10/2008 |
| JP | 2010-42741 A | 2/2010 |

* cited by examiner

*Primary Examiner* — Michael D Lang
(74) *Attorney, Agent, or Firm* — Sughrue Mion, PLLC

(57) ABSTRACT

In a driving support system of a vehicle, there is provided a structure that, even during operating a control based on a machine input, a driver's sense of incongruity can be reduced as much as possible and/or the steering of the driver be can reflected. The vehicle is equipped with a steering assist mechanism and a braking-driving force distribution mechanism of right and left wheels. In operations of the inventive device, a steering assist torque, applied by the steering assist mechanism, is controlled to a target value determined with reference to a target steering torque to achieve the target route, determined without depending on steering of a driver, and a driver's steering torque; and a braking-driving force difference between the right and left wheels is controlled to a target value based on a steering angle of the driver.

8 Claims, 3 Drawing Sheets

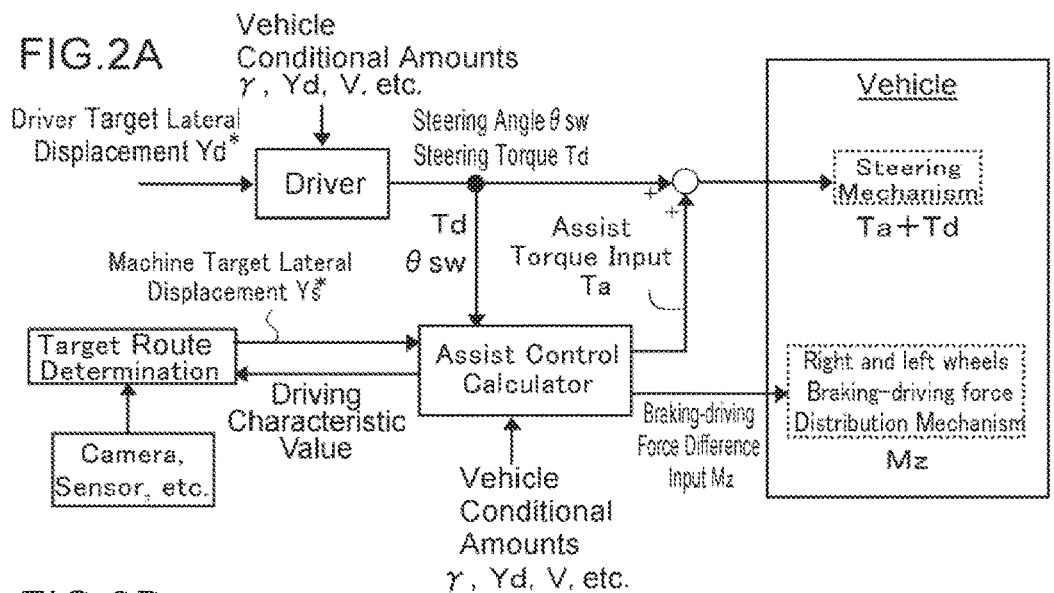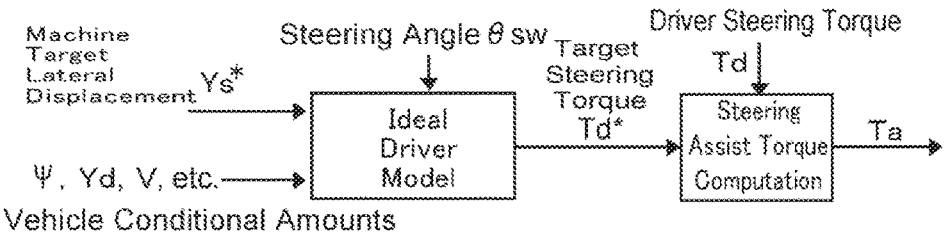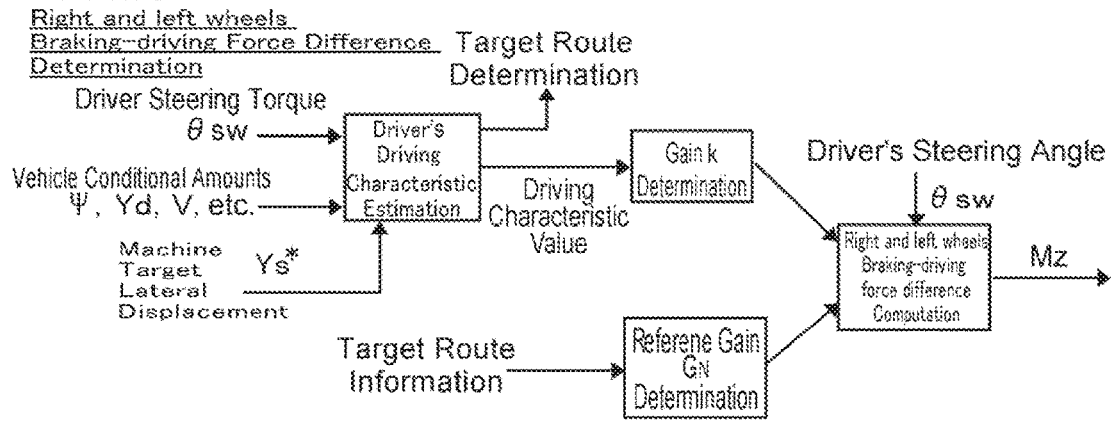

Figure 1:
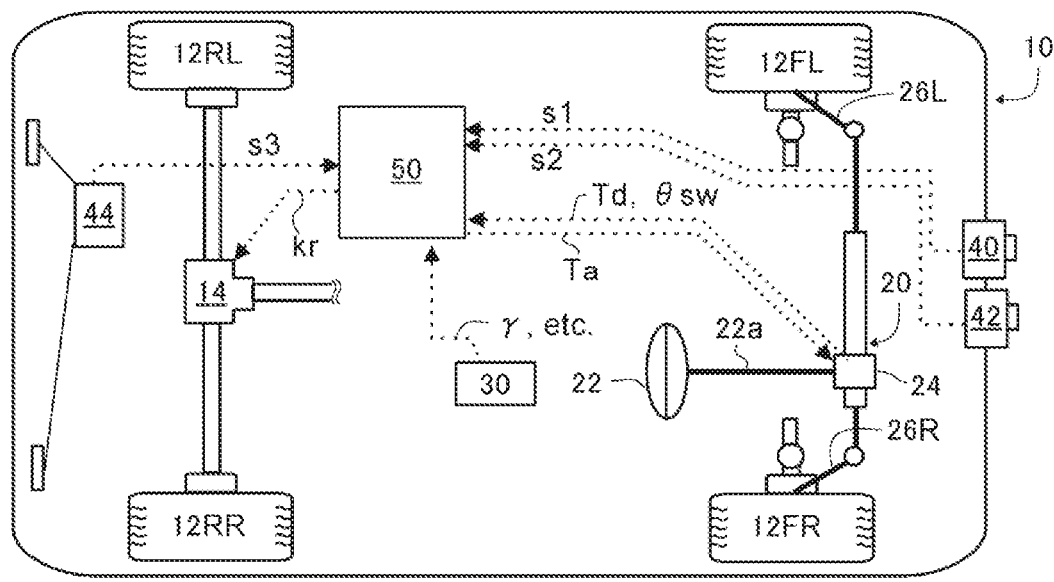

FIG.3A
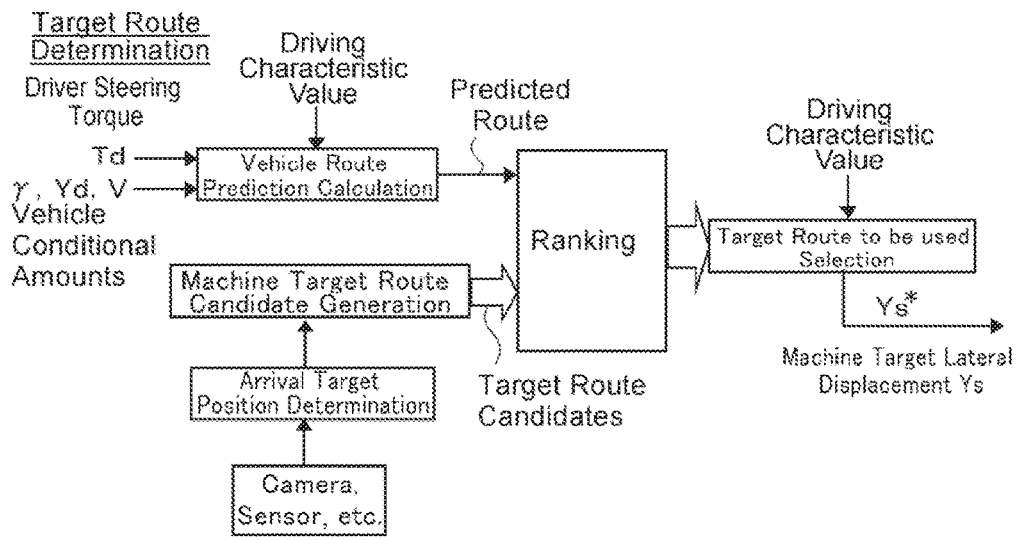
FIG.3B
| Rank | | Rank 1 Route Candidate C | Rank 2 Route Candidate A | Rank 3 Route Candidate D | Rank 4 Route Candidate B |
|---|---|---|---|---|---|
| Driver Skill level | 1 (Low) | Selected | | | |
| | 2 | | Selected | | |
| | 3 | | | Selected | |
| | 4 (High) | | | | Selected |
FIG.3C
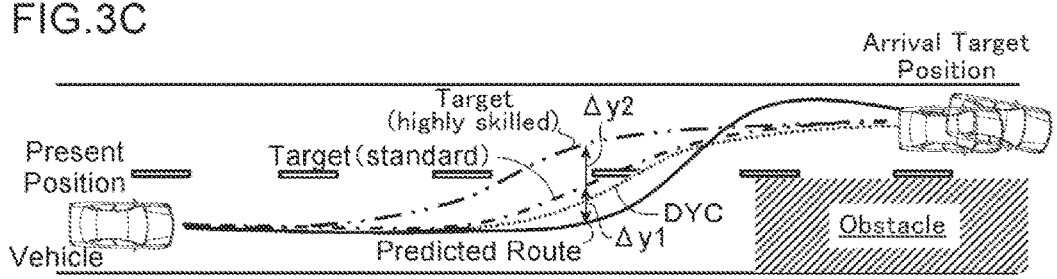

VEHICLE DRIVING SUPPORT CONTROL DEVICE

TECHNICAL FIELD

The present invention relates to a device for supporting the driving of a vehicle, such as an automobile, and more specifically to a device which performs a driving support in a vehicle equipped with a steering assist mechanism and a right and left braking-driving force distribution mechanism (a direct yaw moment control mechanism, a torque vectoring mechanism, etc.) while coordinating operational controls of those mechanisms and a driver's operation in the driving support control.

BACKGROUND ART

In the field of the driving control of a vehicle, such as an automobile, there have been proposed various types of driving support systems and/or automatic driving systems to control a steering mechanism and/or an accelerating-decelerating mechanism of a vehicle so that a driver can drive the vehicle more easily. For instance, in the Lane Keeping Assist (LKA) control, in order to prevent a running vehicle from deviating from its lane, a caution is given to a driver with a warning buzzer, etc., when the vehicle is likely to deviate from its lane. Further, in a radar cruise control, a steering support for a driver is performed to execute a speed control which maintains a vehicle speed to a set speed without depressing an accelerator pedal while making the vehicle running along a lane. Also, in the Intelligent Parking Assistant (IPA), a steering support is performed in parallel parking or vehicle garaging. Moreover, in patent document 1, there is disclosed a structure in which, in conducting a lane change of a running vehicle, the steering reaction force of a handle is changed so as to bring the actual steering angle close to an optimal steering angle computed based on circumference environment information, thereby making it easy for a driver to adjust the steering angle to the optimal steering angle. Patent document 2 discloses one manner for driving support in which a target steering angle is determined based on circumferential information of a vehicle, and a steering assist force is increased in the same direction as the target steering angle and decreased in the opposite direction to the target steering angle. Furthermore, patent document 3 discloses a structure of driving support in which a lateral acceleration compensation amount for making a vehicle go to a target position determined using an image of an in-vehicle camera is computed out while the magnitude of a driver's steering amount is detected, and when the steering amount is smaller than a predetermined threshold value, a steering control is performed after slowing down the vehicle so that the lateral acceleration compensation amount may be achieved, and, when the steering amount is larger than the predetermined threshold value, the vehicle is slowed down after performing a steering control so that the lateral acceleration compensation amount may be achieved.

PRIOR TECHNICAL DOCUMENTS

Patent Documents

Patent document 1: Japanese Patent No. 4173292
Patent document 2: Japanese Laid-open Patent Publication No. 2000-72021
Patent document 3: Japanese Laid-open Patent Publication No. 2010-42741

SUMMARY OF INVENTION

Technical Problem

Generally, a driving support system or an automatic driving system as described above is configured to select, as the operational control of a vehicle, either of a control only based on an input by a system, i.e., a machine (a machine input—a target input set by a machine based on circumferential environment information, etc.) and a control only based on an input by a driver (a target input set based on a driver's steering input), or to guide the steering of a driver to a target condition determined based on a machine input. For example, in the case of a cruise control system, during its operation, when a driver performs an override to the operational control by the system, such as a steering input, an accelerator or brake pedal input, etc. for right or left turning, lane changing or urgent avoidance, the system will suspend its operation, and after this, the motion of the vehicle will be controlled based on a driver input. Also in IPA, its operation is interrupted by an override through a driver's handle steering operation. Moreover, in a case of a structure of making it easier to steer in the direction toward a target value, such as an optimal steering angle or a target steering angle, determined based on circumference information of a vehicle, etc. as described in patent documents 1-2, or in a case of a structure of determining, with the magnitude of a driver's steering amount, which of a steering control and a deceleration of a vehicle is executed first in realizing a lateral acceleration compensation amount determined based on circumference information, etc. of the vehicle, as in patent document 3, the driver's own intention or characteristic in driving a vehicle (the way of reacting to a situation, a peculiarity, a habit, etc.) is hardly reflected in the motion of the vehicle under operation of the driving support control, and therefore, it can be said that the control is executed substantially only based on a machine input.

Such a control only based on a machine input is expected to realize more efficient driving of a vehicle as compared with a control only based on a driver input. Moreover, although the light weighting of a vehicle is hoped from the point of view of environmental problems and requests for low fuel consumption and low electric power consumption, there are concerns that the stability of a vehicle against side winds or road surface disturbances could deteriorate in the case of a lightweight vehicle because of its small moment of inertia in the yaw direction, deteriorations of aerodynamic performances, etc., and therefore, the usefulness of the driving support control based on a machine input becomes higher. However, in a vehicle operated by the system for driving support control as described above, if it is supposed that the operating state only based on a machine input be always maintained (In that case, the vehicle would be driven in a perfect automatic driving condition), the steering based on the intention or characteristic of a driver himself in driving a vehicle would not be substantially reflected in the motion of the vehicle, and thus, if the motion of the vehicle differs from the motion expected by the driver's steering, the driver can have a sense of incongruity to the difference. In this respect, in a case that a steering wheel and tires are not directly linked mechanically in the structure of a vehicle, it would become difficult for a driver to sensuously grasp the condition of the running vehicle. In order to solve it, for example, there can be considered a structure which gives a driver an apparent steering reaction force and an apparent pedal reaction force based upon vehicle motions using a steer-by-wire system. However, it is also difficult for the driver to intuitively perceive the condition of the vehicle which he/she is driving because of the acquisition delay of ambient environment information and/or control operation delay. On the other hand, in a case of a vehicle in which a steering wheel and tires have been linked to one another directly mechanically, although a driver can recognize the steering angle information and reaction torque information directly and highly sensitively through the hands grabbing a handle, when a large steering angle input and a large steering reaction force are generated, for example, in realizing a large control input only with a steering mechanism in order to make a running route of a vehicle follow a target track set by the machine in entering into a curve, the driver grabbing the handle will feel, through the sense of hands, the difference of the large steering angle input and large steering reaction force, corresponding to the control input by the machine, from the steering angle and/or torque that the driver wants to input by himself.

In the point of view of the comfortableness in the driving of a vehicle, it is preferable to avoid the occurrence of the sense of incongruity of a driver due to executing a control based on a machine input in a driving support system or an automatic driving system as described above. Also, even though a vehicle can be driven efficiently by a control based on a machine input, if the steering of a driver is not reflected in the driving condition of the vehicle at all, the driver would feel the sense of incongruity against the driving more strongly. However, in the case of a structure as described above in which the driving condition of a vehicle is determined alternatively by the operation only based on a machine input or by the operation only based on a driver input, the advantageous effect of the control based on the machine input could not be obtained when the operation only based on a driver input is chosen for reducing a driver's sense of incongruity or achieving a driver's intention or characteristic. Furthermore, as noted above, in a case of a structure of guiding the steering of a driver so that the driving condition of a vehicle will follow the operation based on a machine input, when the difference in the magnitude and manner of change becomes large between the steering angle input and steering force for realizing a motion condition (a target value of a vehicle motion) of a vehicle determined based on a machine input and the steering angle or steering force that a driver himself tries to input, the driver's sense of incongruity will increase against that the steering angle or steering force that the driver is going to input, i.e., the steering of the driver, is not reflected.

Thus, one object of the present invention is to provide a structure which can reduce occurrences of the driver's sense of incongruity as much as possible even during an operation of a control based on a machine input in a driving support system or an automatic driving system of a vehicle.

Further, another object of the present invention is to provide a structure in which a driver's intention for the driving of a vehicle can be reflected even during an operation of a control based on a machine input in a driving support system or an automatic driving system of a vehicle as described above.

Solution to Problem

According to the present invention, the above-mentioned object is achieved by a driving support control device of a vehicle equipped with a steering assist mechanism and a braking-driving force distributing mechanism of right and left wheels, comprising: a target route determiner which determines a target route of the vehicle in the driving support control without being based on steering of a driver; a steering assist torque determiner which determines a target value of a steering assist torque to achieve a target steering torque, determined based on a target route, with reference to the target steering torque and a steering torque of the driver; a right and left wheels' braking-driving force difference determiner which determines a target value of a braking-driving force difference between right and left wheels based on a steering angle of the driver; a steering assist torque controller which controls the steering assist torque given by the steering assist mechanism to the target value of the steering assist torque; and a right and left braking-driving force difference controller which controls the braking-driving force difference between the right and left wheels given by the braking-driving force distribution mechanism of the right and left wheels to the target value of the braking-driving force difference between right and left wheels.

In the above-mentioned structure,

The "steering assist mechanism" may be a device which assists a driver to steer a vehicle by adding a steering assist torque in steering with a handle, etc. by the driver, for example, a power steering device, etc., as well known in this field;

The "steering assist torque" is a torque given by the steering assist mechanism;

The "braking-driving force distributing mechanism of right and left wheels" may be a mechanism which can arbitrarily adjust the magnitudes and/or ratios of braking-driving forces in the respective right and left wheels of a vehicle, and for this mechanism, there may be employed a mechanism with a right and left driving force distributing differential gear of various types, which distributes a driving force transmitted from one prime mover (an engine or a motor) through a propeller shaft to the right and left wheels at arbitrary ratios; a mechanism which controls braking-driving force distribution by adjusting braking forces of right and left wheels arbitrarily; or a mechanism in which in-wheel motors independently control braking-driving forces of the respective wheels;

The "driving support control" is a control which controls the steering angle or the turn direction (a steering torque, a yaw rate, a yaw moment, etc.) and/or the speed or acceleration and deceleration of a vehicle, to assist the running of the vehicle along a course or direction, judged or determined to be suitable based on circumferential environment information of the vehicle. This control may be, for example, a driving support system as already described, such as LKA, IPA or a system which conducts operational controls of a steering mechanism or an acceleration and deceleration mechanism of a vehicle such that the vehicle will be preferably driven along a running route set suitably for a destination that a driver wishes (a future course).

The "target route" is a suitable route to which a vehicle is guided in the above-mentioned driving support control. The target route may be typically a running route of the vehicle determined by an arbitrary way using, for example, circumference information of the vehicle, i.e., the information acquired with a camera, a radar sensor, a GPS device, etc., or information on a future course as described above, without depending upon the actual steering of a driver. More concretely, for example, first, a target arrival position of a vehicle is determined from circumferential information or a future course of the vehicle, and then, for a route from the present position of the vehicle to the target arrival position, a "target route" will be determined to be e.g. a route through which the vehicle can reach to the target arrival position in the shortest time, a route through which the vehicle reach to the target arrival position with the minimum energy consumption, based upon arbitrary conditions considered to be important in the control through an arbitrary algorithm, etc.

The "target steering torque" is, in this case, a steering torque sequentially requested in a process for making a vehicle moving along the above-mentioned "target route". In the computation of the "target steering torque", typically, a target value of a displacement requested to the vehicle every moment in making the vehicle move along the "target route" ("target displacement amount"), for example, the lateral displacement of a vehicle, is determined, and the "target steering torque" is computed as a steering torque for achieving the "target displacement amount." The target steering torque may be a steering torque in assuming, for example, that an "ideal driver model" realizes the target displacement amount. The "ideal driver model" may be a model of a driver who has an ideal response characteristic in driving a vehicle, and the ideal response characteristic may be appropriately set by a designer of the device.

As noted above, in the structure of the inventive device, as understood from the above-mentioned structure, a control based on a machine input, i.e., a control for achieving a target route of a vehicle determined without depending upon the steering of a driver, is performed by applying a steering assist torque by a steering assist mechanism, and a control based on a driver input, i.e., a control of a vehicle motion requested by the steering of the driver himself, is performed by applying a braking-driving force difference between right and left wheels through a braking-driving force distribution mechanism of the right and left wheels, and thereby, the demand to the vehicle motion by the control based on a driver input is reflected and realized at a certain degree in the vehicle motion under the control based on a machine input, and thus, the reduction of the driver's sense of incongruity in the driving is expected.

Moreover, the feature to be noted especially in the above-mentioned inventive structure is the structure in which the vehicle motion control based on the steering of a driver (the control based on a driver input) is performed by applying a braking-driving force difference between right and left wheels through the braking-driving force distribution mechanism of the right and left wheels. In this structure, a yaw moment can be generated without changing the steering angle of tires so that no significant self-aligning torque will be generated. Also, usually, the direction of the vehicle motion in accordance with a control based on the steering of a driver is almost the same as the direction of the vehicle motion in accordance with a control based on a target route of the vehicle determined without depending on the steering of the driver (the control based on a machine input), and therefore, a part of the control amount (yaw moment) requested by the control based on the target route of the vehicle will be shared to a braking-driving force difference between the right and left wheels to be applied through the braking-driving force distribution mechanism of the right and left wheels, and accordingly, the control amount to the steering assist mechanism, i.e., the steering assist torque, will be reduced. Thus, according to the structure of applying a braking-driving force difference between right and left wheels corresponding to the steering of a driver, the intention of the driver in his/her driving will be reflected without generating self-aligning torque, and also, the steering assist torque for achieving the target route of the vehicle is reduced, and thereby, it becomes possible to reduce the self-aligning torque so that the reduction of the sense of incongruity of the driver owing to the self-aligning torque will be achieved.

As noted above, the steering assist torque to achieve a target steering torque, determined based on a target route, is determined with reference to the target steering torque and a driver's steering torque. Concretely, in one manner, the steering assist torque may be a value obtained by deducting the driver steering torque from the target steering torque. Then, preferably, the torque being generated around the steering wheel during the control will become the target steering torque so that the followability of the target route of the vehicle will be more ensured. In addition, since the steering assist torque is determined with reference to the driver's steering torque, the steering assist torque can be adjusted at an appropriate magnitude with reference to the steering torque which the driver actually applies to the steering wheel, avoiding the application of an excessively high or low steering assist torque in achieving the vehicle motion along the target route.

With respect to the above-mentioned structure of applying a braking-driving force difference between right and left wheels based on the steering angle of a driver, the braking-driving force difference between the right and left wheels to be applied may typically be a value proportional to the steering angle of the driver. Further, more preferably, the magnitude of the target value of the braking-driving force difference between the right and left wheels may be changed based on a driver's driving characteristic value, representing a driving characteristic of the driver. Namely, the target value of a braking-driving force difference between right and left wheels may be changeable not only according to the steering angle generated by the driver, but also with the driver driving characteristics value. According to this structure, if the driver's driving ability is changed, in response to this, the target value of the braking-driving force difference between the right and left wheels will be changed so that the driving support control can be provided to be suitable for the driver's condition. Moreover, the braking-driving force difference between the right and left wheels to be applied can be changed according to the running situation of a vehicle, for example, depending upon whether or not it is a case of changing the running lane. The driver's driving characteristic value may be sequentially estimated by the driver's driving characteristic value estimator in the inventive device, and it is preferable that the target value of the braking-driving force difference between the right and left wheels can be determined to be in conformity with a change of the estimated driver's driving characteristic value, i.e., an occurrence of a change in the running environment or the driving condition of the driver.

Furthermore, in the above-mentioned inventive device, a target arrival position determiner which determines a target arrival position of the vehicle as a target of the control based on a machine input may be provided in the target route determiner which determines a target route without depending on the steering of the driver, and the target route may be determined based on the determined target arrival position and the driver's driving characteristic value representing a driving characteristic of the driver. According to this structure, it becomes possible to determine the target route to the target arrival position in conformity with the driver's driving characteristic. In this respect, as explained in the column of Embodiments, for a route from the present position of a vehicle to a target arrival position, two or more candidate routes can be considered in accordance with conditions considered to be important in the running of a vehicle, such as an arrival time and a consumption energy, etc., and the driving difficulties, the steering amounts for achieving the respective routes are mutually different. Thus, in one manner, it may be designed that, for each driver an actually used, preferable target route can be chosen from among two or more target candidate routes in accordance with the driver's driving characteristic value. Accordingly, the target route determiner may comprise a target candidate route generator which generates two or more target candidate routes based on the target arrival position of the vehicle, and a used target route selector which selects a target route to be actually used from among the two or more target candidate routes based on the driver's driving characteristic value.

In the above-mentioned structure of selecting a target route from two or more target candidate routes, more concretely, the used target route selector may be designed to select the actually used target route based on the level of a driver's driving skill determined based on the driver's driving characteristic value. Thereby, the driving support along a target route conformed to a driver's driving skill becomes achievable so that further reduction of the driver's sense of incongruity in the driving will be expected. In this respect, it is considered that, usually, a driver of high driving skill can apply a more accurate steering amount and his/her applicable range of the steering amount is wider as compared to a driver of low driving skill, and thus, in a case of a driver of high driving skill, a target route in which a larger target steering torque will be applied may be selected as compared to a case of a driver of low driving skill.

Effect of Invention

Thus, in the above-mentioned inventive device, as noted, the driving support control of a vehicle is executed such that a control of making the vehicle follow a target route determined based on circumferential information, a future course, etc. of the vehicle without depending upon the actual steering of a driver is performed by applying the steering assist torque while a control corresponding to the steering of driver himself is performed by applying a braking-driving force difference between right and left wheels. In this structure, even when the control based on a driver input is performed, the control based on a machine input is not interrupted, and therefore, the followability to the target route is ensured. Furthermore, together with this feature, the reduction of the driver's sense of incongruity to the control is expected because the driver's intention in the driving is reflected at a certain degree in the motion of the vehicle by applying the braking-driving force difference between right and left wheels corresponding to the steering of the driver and the magnitude of the steering assist torque for making the vehicle follow the target route is reduced through applying the braking-driving force difference between the right and left wheels so that self-aligning torque will be reduced. In other words, in the case of the present invention, both the reflection of a driver's intention and the followability to a target route based on circumferential information, a future course, etc. of a vehicle can be achieved by sharing a control based on a machine input and a control based on a driver input between a steering assistant control and a right and left wheels' braking-driving force distributing control, so that it is expected to achieve a driving support control while improving its cooperativity to the steering of a driver, and thereby the driving comfortability. And, in a case that a steering assist torque given by a steering assistant control in a control of making a vehicle follow a target route is determined using a characteristic of an ideal driver model, since an actual driver's driving operation will be corrected to be closer to the driving operation of the ideal driver model (in a condition where the feeling that the driver is actually driving the vehicle by himself is maintained), it is expected that the driver can feel that he could perform skillful drive.

Other purposes and advantages of the present inventions will become clear by explanations of the following preferable embodiments of the present invention.

BRIEF DESCRIPTIONS OF DRAWINGS

FIG. 1 is a schematic drawing of a vehicle installed with a preferable embodiment of a vehicle driving support control device to which the present invention is applied.

FIG. 2A shows a structure of a system in accordance with one embodiment of the inventive vehicle driving support control device in the form of block diagram. FIG. 2B shows a structure which determines a steering assist torque in an assist controller in the driving support control device of a vehicle in the form of block diagram. FIG. 2C shows a structure which determines a right and left wheels' braking-driving force difference in an assist controller in the driving support control device of a vehicle in the form of block diagram.

FIG. 3A shows a structure of a target route determiner in the driving support control device of a vehicle in the form of block diagram. FIG. 3B shows a map for ranking the difficulties of two or more generated target routes in the rank determiner of FIG. 3A. FIG. 3C schematically shows running routes of a vehicle in a case that the present invention is applied and in a case that the driving support control is not applied. The route designated with Target (standard) is a target route for a driver of a standard driving skill level in the driving support control in accordance with the present invention and the route designated with Target (highly skilled) is a target route for a driver of a driving skill level higher than the standard in the driving support control in accordance with the present invention. The route designated with DYC is a route in a case that only a right and left wheels' braking-driving force distributing control is performed.

EXPLANATIONS OF REFERENCE NUMERALS

10—Vehicle
12FL, FR, RL, RR—Wheels
14—Differential gear mechanism (or right and left driving force distributing differential gear)
20—Steering device
22—Handle
24—Steering booster device
26R, L—Tie rod
30—Yaw rate, lateral acceleration sensor
40—In-vehicle camera
42—In-vehicle radar device
44—GPS device
50—Electronic control device

DESCRIPTIONS OF EMBODIMENTS

The Structure of a Vehicle

Referring to FIG. 1, a vehicle 10, such as a car, into which a preferable embodiment of the inventive driving support control device is installed, is equipped with right and left front wheels 12FL, 12FR; right and left rear wheels 12RL, 12RR; a driving device which generates braking-driving forces on the respective wheels (only rear wheels in a rear-wheel-drive vehicle as illustrated. The vehicle may be a front-wheel-drive vehicle and a four-wheel drive vehicle) in response to the depressing of an accelerator pedal by a driver (only partially illustrated); a steering device 20 for controlling the steering angle of front wheels (further, a steering device may be equipped for the rear wheels); and a braking device which generates a braking force in each wheel (not shown) in a usual manner. The driving device is designed such that a driving torque or a rotational force is transmitted from an engine and/or an electric motor (not shown) through a transmission (not shown) and the differential gear mechanism 14 to the rear wheels 12RL and 12RR in a usual manner. In this regard, the driving device may be a hybrid type driving device having both engine and electric motor. For the differential gear mechanism 14, in a case of performing a torque vectoring control by regulation of the distribution of the driving forces transmitted to the right and left wheels, a right and left driving force distributing differential gear which can perform the torque vectoring control may be employed. In this regard, in the differential gear mechanism 14, the regulation of the distribution of the braking-driving forces of the right and left wheels may be performed through adjusting the distribution of the braking forces of the right and left wheels. Furthermore, the driving device may be a driving device of type of in-wheel motor, and in that case, the regulation of the braking-driving forces are performed separately in the respective wheels. Also, the control of distributing right and left wheels' braking-driving forces may be performed by adjusting each wheel braking force independently with the braking device.

For the steering device 20, there may be employed a power steering device which transmits rotation of a steering wheel (handle) 22 operated by a driver to tie rods 26L and R, while boosting its rotational torque with a booster device 24, to steer the front wheels 12FL and 12FR. Especially, in the present invention, as explained later, since the driving support control uses a steering angle and a steering torque which a driver applies to a handle, there may be provided arbitrary sensors detecting or estimating the steering angle θsw and/or the steering torque Td. In this regard, in the structure of this embodiment, in order for the driver to perceive through the handle a condition of the occurrence of a torque (self-aligning torque, etc.) in the yaw direction in the steered wheels (the right and left front wheels in the illustrated example), a mechanism in which the handle and steered wheels are mechanically directly linked to one another is employed.

Moreover, in the vehicle 10 to which a preferable embodiment of the inventive driving support control device is applied, there may be provided an in-vehicle camera 40, a radar device 42, etc. for detecting a circumferential situation of the vehicle, for example, road white lines (or yellow lines), other vehicles, obstacles, etc. around the own vehicle; and a GPS device 44 which communicates with a GPS satellite and acquires diverse information, including the information on the position of the own vehicle, etc. (car-navigation system).

Operational controls of the respective portions of the vehicle and operational controls of the driving support control device according to the present invention are executed by an electronic control device 50. The electronic control device 50 may comprise a microcomputer and drive circuits which have a CPU, a ROM, a RAM and input/output port apparatus mutually connected by bidirectional common bus in a usual way. The structures and operations of the respective portions in the inventive driving support control device as explained later may be realized by the operations of the electronic control device (computer) 50 according to the programs, respectively. Into the electronic control device 50, there are inputted a driver's steering torque Td, a steering angle θsw, a yaw rate γ and/or a lateral acceleration Yg from a gyro sensor 30, information s1-s3 from the in-vehicle camera 40, the radar device 42, the GPS device 44, etc., and in manners mentioned later, control demands indicating a steering assist torque Ta, a control amount for a right and left wheels' braking-driving force distributing control (e.g., driving force distribution ratio kr), etc. are outputted from the electronic control device 50 to the corresponding devices. In this regard, although not illustrated, various parameters necessary for various controls to be performed in the vehicle of this embodiment, such as various detected signals, e.g., a longitudinal G sensor value, wheel speeds, etc., may be inputted and various kinds of control demands may be outputted to the corresponding devices from the electronic control device 50.

Overview of Driving Support Control

In the driving support control technique according to the present invention, as explained in the column of "Summary of Invention", a control for making a vehicle move along a target route determined based on vehicle circumferential information and/or the information on a future course set preferably for a destination that a driver wishes to go to, namely, a control based on a machine input, is performed by applying a steering assist torque while a control based on the steering by a driver's handle operation, namely, a control based on a driver input, is performed by applying a braking-driving force distribution difference between right and left wheels. According to this control, it becomes possible to reflect the steering of a driver on a vehicle motion under the driving support control while ensuring the followability to a target route in a vehicle motion, and thereby, it is expected that the driver's sense of incongruity that the own steering is not reflected in the vehicle motion will be reduced.

Further, the control amount necessary for making a vehicle motion follow a target route is shared not only with a steering assist mechanism but also with a braking-driving force distribution mechanism for right and left wheels, and thereby, the steering assist torque to be applied will decrease. Additionally, when a braking-driving force difference between the right and left wheels is generated by the right and left wheels' braking-driving force distribution mechanism, this does not increase the tire steering angle, and accordingly, no self-aligning torque is generated substantially. Thus, the difference between the steering torque which a driver tried to apply through a handle and the torque which the driver perceives from the handle is reduced so that further relief of the driver's sense of incongruity will be achieved.

Furthermore, since the steering assist mechanism and the right and left wheels' braking-driving force distribution mechanism are equipped for the driving support control, it is advantageous in that, even if there occurs any fault in one of the mechanisms, the control can be performed by the other mechanism.

Structure of Driving Support Control Device

In a vehicle to which the inventive driving support control device is applied, the driving operation of the vehicle is achieved by operations of the steering mechanism and the right and left wheels' braking-driving force distribution mechanism in accordance with the steering of a driver and control amounts that an assist control calculator determines in accordance with the driving support control. And as noted above, in the driving support control of this embodiment, the control amount for making the vehicle run along a target route set based upon vehicle circumferential information, etc. is given as a steering assist torque input to the steering assist mechanism (the steering device 20), while the control amount for reflecting the steering of the driver in the vehicle motion is given as a right and left wheels' braking-driving force difference input to the right and left wheels' braking-driving force distribution mechanism (the right and left driving force distributing differential gear or the brake mechanism of each wheel).

Referring to FIG. 2A, in a concrete structure of a system including a driver and an embodiment of the inventive driving support control device, first, the driver steers the handle so as to achieve a driver target displacement Yd* determined based on information that he/she recognizes by himself/herself while taking into account the present conditions of a vehicle, such as the lateral displacement Yd, yaw rate γ, yaw angle Ψ, lateral velocity Vy, speed V, etc. of the vehicle, and thereby, a steering angle θsw and a steering torque Td (driver input torque) are given to the steering mechanism of the vehicle. In this regard, it should be understood that an actual driver does not concretely determine a numerical value of the driver target displacement Yd*, but determines a position to be arrived at by visual observation during the driving and conducts a steering operation to the position in accordance with his/her own sense, and also that, similarly, an actual driver takes it into account the present conditions of the vehicle not by referring to those numerical values but by visual observation or his/her own physical senses.

On the other hand, briefly, in the driving support control device, an assist control calculator and a target route determiner are constituted. In the target route determiner, as explained in detail later, a target route is determined so as to realize the driving operation of the vehicle more optimally, using vehicle circumferential information, for example, information, obtained from a camera, etc., on the position of a road white line, the presence or absence or the position of a preceding vehicle or an obstacle on a road, the extending direction of a road, information on a road line shape, etc. of a route or a course, etc., acquired from a GPS device, etc., and/or information on a preferable running route (future course) set to a destination that the driver wishes to go to, and further, a target lateral displacement (machine target lateral displacement) Ys* for making a vehicle move along the target route is determined. Then, into the assist control calculator, there are inputted the target lateral displacement Ys' determined in the target route determiner; index values representing the present conditions of the vehicle (vehicle motion index values), such as the lateral displacement Yd, yaw rate γ, yaw angle Ψ, lateral velocity Vy, speed V, etc. of the vehicle; and also, index values representing the present driving condition of the driver, such as the steering angle θsw and the steering torque Td (driver input steering torque), etc. (driving condition index value), and in a manner as described later, there are computed out a steering assist torque input Ta (a target value of the steering assist torque) to be applied additionally with the driver input torque Td and a braking-driving force distribution input (yaw moment) Mz (a target value of the right and left braking-driving force difference), corresponding to the braking-driving force difference to be generated between the right and left wheels by the right and left wheels' braking-driving force distribution mechanism, and then, those computed values are transmitted as control demands to the steering assist mechanism and the right and left wheels' braking-driving force distribution mechanism of the vehicle.

Structure and Operation of Assist Control Calculator

In the assist control calculator, briefly, there are provided a structure for determining a target value of the steering assist torque and a structure for determining a target value of the braking-driving force difference between the right and left wheels.

(1) Structure for Determining Target Value of Steering Assist Torque

Referring to FIG. 2B, in the structure for determining a target value of the steering assist torque, first, a target steering torque Td* for achieving a target lateral displacement Ys* from the target route determiner is determined. The determination of the target steering torque Td* may be conducted in an ideal driver model portion by computing out a steering torque under an assumption that the machine target lateral displacement Ys* will be achieved according to an arbitrary model describing a response in the driving operation of an ideal driver (ideal driver model). Concretely, first, for example, supposing a driver's response follows a front gaze primary model, the target of the steering angle θsw* is given by the following expression, using the present lateral displacement (lateral position) Yd, yaw angle Ψ and speed V of the vehicle:

$$\theta sw^* = \frac{h^*}{1 + Tn^* \cdot s} \{Ys^* - (Yd + Tp^* V\Psi)\} \quad (1)$$

Here, h*, Tn*, and Tp* are a steering gain, a primary delay time constant and a front gaze duration, representing the driving characteristics of the ideal driver model, respectively, and s is a frequency variable after Laplace transform. h*, Tn*, and Tp*, which are the driving characteristic values of the driver in a case that an ideal response is given in the driving operation of a vehicle, may be set arbitrarily beforehand. Then, assuming that the target steering torque Td* to be applied to the steering wheel is proportional to the difference between the target value θsw* and the current value θsw of the steering angle, the target steering torque Td* is given by:

$$Td^* = Kp(\theta sw^* - \theta sw) \quad (2)$$

Here, Kp is a machine constant determined by the steering mechanism. Thus, in the ideal driver model portion, as illustrated, the target lateral displacement Ys* from the target route determiner, the present lateral displacement (lateral position) Yd, yaw angle Ψ and speed V of the vehicle are inputted. In this regard, in an actual control, the lateral displacement Yd (and target lateral displacement Ys*) and yaw angle Ψ of a vehicle may be values measured from a reference point and a reference direction set arbitrarily, respectively. When the reference point and the reference direction are set at the vehicle, the respective values are set to 0.

When the target steering torque Td* is determined as noted above, in a steering assist torque computer, a target value Ta of the steering assist torque, i.e., a steering assist torque Ta applied in the steering assist mechanism is computed, using the target steering torque Td* and the steering torque Td, applied currently by the driver by:

$$Ta = Td^* - Td \tag{3}$$

Therefore, the torque applied around the steering wheel in the steering device 20 becomes Td+Ta=Td*, and accordingly, in the steering device 20, the torque will be controlled to achieve the target lateral displacement Ys*.

(2) Structure for Determining Target Value of Right and Left Wheels' Braking-Driving Force Difference On the other hand, in the structure for determining the target value of the braking-driving force difference between the right and left wheels, as noted, a target value of the right and left wheels' braking-driving force difference is determined based on the steering by a driver's handle operation. Concretely, with reference to FIG. 2C, in a right and left wheels' braking-driving force difference computer, the target value Mz for the braking-driving force difference between the right and left wheels may be computed, using the driver's steering angle θsw.

$$Mz = k \cdot G_N \cdot \theta sw \tag{4}$$

Here, k is a driving characteristic dependent gain determined by a driver's driving characteristic (estimated as described later), and $G_N$ is a reference value of a gain (reference gain). The target value Mz for the right and left wheels' braking-driving force difference may be computed in the unit of yaw moment to be generated in the vehicle. In the case of Expression (4), since the target value Mz for the right and left wheels' braking-driving force difference is set to be proportional to the driver's steering angle θsw as understood from its expression, a yaw moment will be generated on the vehicle, corresponding to the change in the driver's steering angle θsw, and thus, the driver will obtain a feeling that his/her own steering is reflected in the vehicle motion. In this regard, the target value Mz for the right and left wheels' braking-driving force difference may be the other function increasing monotonically to the steering angle θsw.

In Expression (4) as described above, the driving characteristic dependent gain k may be variable, depending upon the present driver's driving characteristic. The driver's driving characteristic may be estimated in a driver's driving characteristic estimator as illustrated, using the driver steering angle θsw and vehicle conditional amounts. Concretely, assuming that a response in a driver's driving operation follows the front gaze model similarly to the case of the ideal driver model as described above, the following relation is established between the driver's steering angle θsw and the present lateral displacement Yd, yaw angle Ψ and speed V of the vehicle:

$$\theta sw = \frac{h}{1 + Tn \cdot s} \{Ys^* - (Yd + TpV\Psi)\} \tag{5}$$

Here, h, Tn, and Tp are the steering gain, primary delay time constant and front gaze duration representing the present driver's driving characteristic, respectively. Thus, using the above-mentioned relation, the present driver's driving characteristic value h, Tn, and Tp may be estimated by a fitting process, etc. with the present values of Td, Yd, Ψ, V, and the target lateral displacement Ys*. Then, since these driving characteristic values h, Tn, and Tp are correlated with a driver's driving skill, the driving characteristic dependent gain k may be determined in a gain k determiner with reference to the estimated driving characteristic values, h, Tn and Tp. Typically, as the steering gain h is higher, the primary delay time constant Tn is shorter, and the front gaze duration Tp is longer, it can be judged that a driver's driving skill is higher (less fatigued, highly concentrated, etc.), and thus, in that case, since a quick response of the steering torque is expected, the driving characteristic dependent gain k may be set low. On the other hand, as the steering gain h is lower, the primary delay time constant Tn is longer, and the front gaze duration Tp is shorter, it can be judged that a driver's driving skill is lower, and thus, in that case, since a quick response of the steering torque is expected, the driving characteristic dependent gain k may be set high in order to increase the degree of the driving support control. Accordingly, it becomes possible to adjust the degree of the driving support in accordance with a driver's situation. Especially in a case that the driver's driving skill falls down, and thus, the capability to follow a target route declines, it becomes possible to compensate the reduction of the followability of a target route by increasing the driving characteristic dependent gain k.

In the above-mentioned Expression (4), while the reference gain $G_N$ may be set arbitrarily in conformity with a characteristic of a vehicle, etc., it may further be variable depending upon a characteristic of a target route. For instance, with reference to information on a target route, the reference gain $G_N$ may be increased in a scene where a higher yaw moment is required, such as in a lane change in the target route (a reference gain $G_N$ determiner), so that a more suitable driving support for the target route can be provided.

Structure and Operation of Target Route Determiner

As noted above, in the structure for determining a target value of a steering assist torque in the assist control calculator, a target lateral displacement Ys* is used. As noted, the target lateral displacement Ys* is determined as the lateral displacement to be achieved every moment based upon a target route, which is determined using vehicle circumferential information and/or information on a future course determined in accordance with the setting of the driver in the target route determiner. In the determination of this target lateral displacement Ys*, briefly, the target route determiner of the inventive driving support control device may be designed to generate two or more realizable candidates for the target route; determine the target route from the two or more candidates, depending on a driver's driving characteristic; and determine the target lateral displacement Ys* based on the determined target route. Concretely, with reference to FIG. 3A, in the target route determiner, there are provided a vehicle route predicting calculator, a target arrival position determiner, a machine target route candidate generator, a rank determiner, and a used target route selector.

First, in the vehicle route predicting calculator, a predicted route of a vehicle after the present time in the case that no driving support control will be performed is computed out, using the present conditional amounts of the vehicle, such as yaw rate γ, yaw angle Ψ, lateral position Yd, speed V, etc., the driver's steering torque Td or the steering torque value, actually applied in a steering device, and the driver's driving characteristic value (Predicted route—FIG. 3C). This computation of the predicted route may be done by calculation with an arbitrary model describing a vehicle motion.

The target arrival position determiner may be configured to determine in an arbitrary manner a position at which the vehicle should arrive after an arbitrary time lapse (a target arrival position) based on vehicle circumferential information obtained with such as a camera and a GPS device, or information on a future course. For example, as illustrated in FIG. 3C, in a case that an obstacle exists in the direction that the vehicle moves, an arbitrary position in the lane next to the lane where the obstacle exists is determined as the target arrival position.

In the machine target route candidate generator, two or more realizable candidates for a target route from the present vehicle position to the target arrival position are generated. For example, as in the example of FIG. 3C, when the vehicle avoids an obstacle to arrive at the position at the side thereof, two or more patterns can be considered for the realizable route from the current position (the left end in the drawing) to the target arrival position. Then, the machine target route candidate generator generates a plurality of such realizable candidates for the route to the target arrival position. In this regard, in the generation of route candidates, routes from which an advantageous effect can be obtained may be generated selectively while considering any conditions, such as the driving difficulty, the magnitude of consumption energy, the arrival time length, etc.

In the rank determiner, by comparing the predicted route obtained in the vehicle route predicting calculator with the two or more target route candidates obtained in the machine target route candidate generator, the differences thereof in the driving difficulty, the possibility of achievement, etc. are determined in accordance with the degrees of deviations of the respective target route candidates from the predicted route, and then, ranking the respective target route candidates is conducted based on the differences. Concretely, for example, in one manner, when four route candidates A-D have been generated as illustrated in FIG. 3B, a rank is assigned to each of the four route candidates A-D in accordance with the driving skill levels requested to a driver in the corresponding route, depending upon the degrees of deviations of the respective route candidates from the predicted route, the expected advantageous effects (energy saving, arrival time), and the driving difficulties. In the case of the routes A-D exemplarily illustrated, the ranks 1-4 are assigned in the order of C, A, D, and B in accordance with the order of the driving skill level from low to high. In this case, for example, to a route in which a highly advantageous effect (e.g., low energy consumption, a short arrival time length) is provided while its driving difficulty is high, a rank of a higher skill level may be assigned, and to a route in which the advantageous effect is low while its driving difficulty is low, a rank of a lower skill level may be assigned. A target route of which the driving difficulty is high is typically, a route in which the deviation distance from the predicted route is long so that the magnitude of the target steering torque will become large if the driving support control is not be performed. Typically, such a target route of which the driving difficulty is high is chosen when a driver's skill level is high.

When the ranking of the respective target route candidates as noted above has been made, this information is referred to in the target route determiner, and in the used target route selector, a target route candidate to which the rank which suits the present driver's driving characteristic has been assigned is selected as the target route based on the present driver's driving characteristic value, and then, the target lateral displacement Ys* is determined successively using the coordinates of the selected target route, etc. For the driver's driving characteristic value, the numerical value, estimated in the driver's driving characteristic estimator in the assist control calculator, may be used. In the selection of a target route, the driver's skill level may be determined based on the driver's driving characteristic value, and the target route candidate which suits the determined skill level may be selected.

Thus, in the operation of the target route determiner, first, a target arrival position is determined from the vehicle circumferential information or the future course information, and two or more target route candidates to the target arrival position are generated. Then, according to the comparison with the two or more target route candidates and the predicted route determined from the present conditions of the vehicle and driver, the ranking of the respective target route candidates is conducted based on the driving difficulties, advantageous effects, etc. thereof, and finally, the target route will be determined with reference to the driver's driving characteristic.

With reference to FIG. 3C again, an example of the target route selected in the above-mentioned target route determiner is reviewed: for example, there is considered a case that two certain target routes exist: a first route candidate [Target (standard)] which has a shorter running distance and a shorter arrival time length than a route which a vehicle would follow when a driver having a certain driving characteristic drives the vehicle without control (with no control), deviating by distance $\Delta y1$ therefrom, and a second route candidate which deviates from the route with no control by distance $\Delta y2$ ($>\Delta y1$) longer than the first route candidate [Target (standard)] and has a more highly advantageous effect while its driving difficulty is high [Target (highly skilled)]. According to the above-mentioned target route determiner, the route [Target (standard)] is chosen when the driver's skill level is at a standard level, while the route [Target (highly skilled)] will be chosen when the driver's skill level is high. In this regard, it should be understood that, even when the driver's skill level is low so that a route having less advantageous effects (its driving difficulty is low) will be chosen, since the driving characteristic dependent gain k increases in the control with the right and left wheels' braking force difference as noted, a compensation at a certain degree will be made for the rather low advantageous effect of the selected route.

Operation of Driving Support Control Device

In the operation of the driving support control device in accordance with the above-mentioned present embodiment, during execution of the control, the target route determiner as noted above determines a target route; a machine target lateral displacement Ys' for every moment is computed out; and a target steering torque Td* for achieving the machine target lateral displacement Ys* is computed using an ideal driver model. Then, the steering assist torque computer computes out a steering assist torque Ta, which is the difference between a target steering torque Td* and the driver's steering torque Td, and the steering assist torque Ta is given as a control amount to the steering assist mechanism. On the other hand, in the right and left wheels' braking-driving force difference computer, a target value Mz for a braking-driving force difference between the right and left wheels is computed out so as to increase, corresponding to the driver's steering torque Td, and given to the right and left wheels' braking-driving force distribution mechanism as a control amount. Thus, when the two control amounts are given to the steering mechanism and the right and left wheels' braking-driving force distribution mechanism, respectively, and the controls are performed, the control of making the vehicle motion follow the target route, i.e., the control based on a machine input, is mainly achieved by applying the steering assist torque Ta, while the control of reflecting the steering of the driver on the vehicle motion, i.e., the control based on a driver input, will mainly be achieved by applying the right and left wheels braking-driving force difference.

In this regard, as noted, the driving support control according to the present invention performs not only the control by applying the steering assist torque Ta but also the control by applying the right and left wheels' braking-driving force difference corresponding to the steering of the driver, thereby, advantageously, reducing the magnitude of the steering assist torque Ta so that the driver's sense of incongruity in the driving will be reduced. Referring to FIG. 3C again, for example, in a case that the deviation distance between a target route to be achieved by performing only the control by applying a steering assist torque Ta without performing the control by applying a right and left wheels braking-driving force difference corresponding to the steering of a driver and the predicted route (no control is performed) becomes Δy1 or Δy2, when the control by applying a right and left wheels braking-driving force difference is performed, since it is expected that, usually, the steering of the driver is conducted to move a vehicle closer to the target route, the actual route of the vehicle changes closer to the target route, e.g. to the route designated with DYC, in accordance with the control by applying right and left wheels' braking-driving force difference, and accordingly, it is expected that the deviation distance of the actual route of the vehicle from the target route will be largely reduced. Then, the machine target lateral displacement Ys* will be reduced, and thereby, the target steering torque Td* for achieving the machine target lateral displacement Ys* is also reduced, and after all, there are acquired the advantageous effects that the magnitude of the steering assist torque Ta is reduced so that the driver's sense of incongruity in the driving will be reduced.

Although the above explanation has been described with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

The invention claimed is:

1. A driving support control device of a vehicle equipped with a steering assist mechanism and a braking-driving force distribution mechanism of right and left wheels, comprising:
    a target route determiner which determines a target route of the vehicle in the driving support control without depending on steering of a driver;
    a steering assist torque determiner which determines a target value of a steering assist torque to achieve a target steering torque determined based on the target route with reference to the target steering torque and a steering torque of the driver;
    a right and left wheels' braking-driving force difference determiner which determines a target value of a braking-driving force difference between the right and left wheels based on a steering angle of the driver;
    a steering assist torque controller which controls the steering assist torque applied by the steering assist mechanism to the target value of the steering assist torque;
    a right and left wheels' braking-driving force difference controller which controls the braking-driving force difference between the right and left wheels applied by the braking-driving force distribution mechanism of the right and left wheels to the target value of the braking-driving force difference between the right and left wheels,
    wherein the target route determiner comprises a target arrival position determiner which determines a target arrival position of the vehicle without depending on the steering of the driver, and determines the target route based on the target arrival position and a driver's driving characteristic value representing a driving characteristic of the driver,
    wherein the target route determiner comprises a target candidate route generator which generates two or more target route candidates based on the target arrival position of the vehicle, and a used target route selector which selects a target route to be actually used among the two or more target route candidates based on the driver's driving characteristic value.

2. The device of claim 1, wherein the magnitude of the target value of the braking-driving force difference between the right and left wheels is changed based on a driver's driving characteristic value representing a driving characteristic of the driver.

3. The device of claim 2, further comprising a driver's driving characteristic value estimator which estimates the driver's driving characteristic value.

4. The device of claim 1, the used target route selector selects the target route to be actually used based on a driving skill of the driver determined based on the driver's driving characteristic value.

5. The device of claim 4, wherein, when the driving skill level of the driver is high, a target route in which a magnitude of the target steering torque becomes larger is selected as compared with when the driving skill level of the driver is low.

6. The device of claim 1, wherein the steering assist torque determiner comprises a target displacement amount determiner which determines a target displacement amount of the vehicle based upon the target route, and a target steering torque computer which computes the target steering torque which realizes the target displacement amount.

7. The device of claim 6, wherein the target steering torque is set to a steering torque in assuming that the target displacement amount is realized by an ideal driver model.

8. The device of claim 1, wherein the steering assist torque is a value obtained by deducting the steering torque of the driver from the target steering torque.

* * * * *